United States Patent [19]

DuPont et al.

[11] Patent Number: 5,075,384

[45] Date of Patent: Dec. 24, 1991

[54] COATING COMPOSITIONS CONTAINING ETHYLENICALLY UNSATURATED CARBAMATES

[75] Inventors: William A. DuPont; Jerome W. Knapczyk, both of Wilbraham, Mass.

[73] Assignee: Monsanto, St. Louis, Mo.

[21] Appl. No.: 699,117

[22] Filed: May 13, 1991

Related U.S. Application Data

[62] Division of Ser. No. 389,082, Aug. 3, 1989, Pat. No. 5,030,696.

[51] Int. Cl.$^5$ ............... C08F 263/00; C08F 265/00; C08F 267/00; C08F 271/00

[52] U.S. Cl. ............... 525/293; 525/278; 525/455; 525/454

[58] Field of Search ............ 525/455, 293, 454, 278; 428/424.2; 522/90, 96

[56] References Cited

U.S. PATENT DOCUMENTS

| | | | |
|---|---|---|---|
| 3,749,592 | 7/1973 | Gaske et al. | 117/62 |
| 3,871,908 | 3/1975 | Spoor et al. | 117/93.31 |
| 3,925,320 | 12/1975 | Morgan | 260/77.5 |
| 4,565,857 | 1/1986 | Grant | 527/301 |
| 4,609,706 | 9/1986 | Bode et al. | 527/7.4 |
| 4,654,233 | 3/1987 | Grant et al. | 427/379 |
| 4,670,308 | 6/1987 | Knapczyk | 427/350 |

FOREIGN PATENT DOCUMENTS 2168623 of 0000 France .

*Primary Examiner*—Melvyn I. Marquis
*Assistant Examiner*—W. R. H. Clark
*Attorney, Agent, or Firm*—R. Bruce Blance; William J. Farrington; Richard H. Shear

[57] ABSTRACT

Ethylenically unsaturated carbamates prepared by addition of unsaturated isocyanates to the hydroxy groups of styrene allyl alcohol copolymers are formulated with allylic monomers and unsaturated co-reactants selected from (meth)-acryloyl monomers and oligomers, maleates and fumarates to provide air-dry-and heat-curable coating compositions.

14 Claims, No Drawings

COATING COMPOSITIONS CONTAINING ETHYLENICALLY UNSATURATED CARBAMATES

This is a division of application Ser. No. 07/389,082, filed Aug. 3, 1989, now U.S. Pat. No. 5,030,696.

This invention relates to protective coatings and in particular it relates to protective coatings of ethylenically unsaturated carbamates of styrene allyl alcohol copolymers and their use in air-dry and forced dry curable coating compositions.

Conventional lacquers for wood furniture have utilized nitrocelluloses and cellulose esters as the resin component. These lacquers provide high gloss coats but are generally deficient in solvent resistance and scratch resistance. These deficiencies have been addressed by modifying the nitrocelluloses and cellulose esters with ethylenic unsaturation to allow the coatings to be applied to wood surfaces to form thermoplastic films which can be repaired, rubbed or buffed in conventional fashion to provide the quality finish required for saleability. Then by irradiation with ultraviolet light or electron beam, the coatings are converted to the solvent resistant, physically tough form which is preferred for enhanced durability.

Such unsaturated nitrocelluloses and cellulose esters have been formed by reaction with unsaturated isocyanates. However, they have been found deficient in many aspects. In some instances a high level of unreacted isocyanate has posed a toxic hazard in the spray application of the lacquer. The resins are applied as low solids solutions to overcome their viscous nature and hence generate high levels of volatile organic compounds when the lacquers are applied to substrates. The resins are incompatible with many of the co-reactants which are used to enhance the degree of radiation cure and thus the choice of co-reactant is limited.

The present invention provides coating compositions capable of cure under air-drying conditions comprising an ethylenically unsaturated carbamate of a styrene allyl alcohol copolymer, an $\alpha,\beta$-ethylenically unsaturated co-reactant and a $\beta,\gamma$-ethylenically unsaturated co-reactant. The present invention further provides a method of protecting a substrate with a coating, comprising applying to the substrate a coating composition comprising an ethylenically unsaturated carbamate of a styrene allyl alcohol copolymer, an $\alpha,\beta$-ethylenically unsaturated co-reactant and a $\beta,\gamma$-ethylenically unsaturated co-reactant, drying the coating composition to remove solvent and curing the dried coating by air-dry or forced dry methods. The coating compositions therefore provide the advantage of curability without the need for radiation-induced crosslinking and consequently may be used to advantage on shaped substrates since the cure method is not limited by the shadow effects of radiation cure. The dried coating may optionally be sanded, buffed or repaired prior to curing to provide a glossy, tough, durable, defect-free finish. The ethylenically unsaturated carbamates supply the necessary degree of hardness to the coating composition to allow such sanding and buffing prior to curing and to enhance the hardness and durability of the cured coating.

The ethylenically unsaturated carbamates of styrene allyl alcohol copolymers are prepared by reaction of the alcohol groups of the styrene allyl alcohol copolymer with ethylenically unsaturated isocyanates. The styrene allyl alcohol copolymers are those containing from about 50 to 94 percent by weight of styrene or a substituted styrene monomer, and preferably 60 to 85 percent by weight and correspondingly, from about 50 to 6 percent by weight of the ethylenically unsaturated alcohol, and preferably from about 40 to 15 percent on the same basis. In general, the styrene allyl alcohol copolymers have from about 1.8 to 10 percent hydroxy groups by weight, preferably 4 to 9 percent. The styrene allyl alcohol copolymers are of number average molecular weight in the range of about 400 to about 500 daltons, and more preferably in the range of about 800 to about 2000 daltons and contain sufficient ethylenically unsaturated alcohol to provide on average at least about two hydroxy groups per molecule and preferably from 2 to 10 hydroxy groups per molecule. The actual hydroxy group content of the aforesaid copolymers may not always conform to the theoretical content calculated from the relative proportions of styrene monomer and ethylenically unsaturated alcohol, due to possible destruction of hydroxy groups during copolymerization.

The styrene monomer moiety of the copolymer may be styrene or a ring-substituted styrene in which the substituents are 1-4 carbon atom alkyl groups or chlorine atoms or mixtures thereof. Examples of such ring-substituted styrenes include the ortho-, meta-, and para-, methyl, ethyl, butyl, etc., monoalkyl styrenes, 2,3-, 2,4-dimethyl and diethyl styrenes; mono-, di- and trichlorostyrenes, etc. Mixtures of two or more of such styrene monomer moieties may be present. The ethylenically unsaturated alcohol moiety may be allyl alcohol, methallyl alcohol, or a mixture thereof. For the purposes of brevity and simplicity of discussion, the entire class of copolymers set forth in this paragraph shall hereinafter be referred to simply as styrene allyl alcohol copolymers.

The styrene allyl alcohol copolymers may be prepared in several ways. One operable method which yields styrene allyl alcohol copolymer starting materials which are solid products is taught in U.S. Pat. No. 2,894,938.

Useful isocyanates for addition to the styrene allyl alcohol copolymers include vinyl isocyanates, isocyanatoalkyl acrylates and methacrylates and a variety of aralkyl monoisocyanates. Specific isocyanates include vinyl isocyanate, isopropenyl isocyanate, 2-isocyanatoethyl acrylate, 2-isocyanatoethyl methacrylate, 3-isocyanatopropyl methacrylate, 1-methyl-2-isocyanatoethyl methacrylate, 1,1-dimethyl-2-isocyanatoethyl methacrylate, 1-(1-isocyanatoethyl)-3-vinylbenzene, 1-(1-isocyanatoethyl)-4-vinylbenzene, 1-(1-isocyanato-1-methylethyl)-3-(1-methylethenyl) benzene and 1-(1-isocyanato-1-methylethyl)-4-(1-methylethenyl) benzene.

The preferred isocyanates are 2-isocyanatoethyl acrylate, 2-isocyanatoethyl methacrylate, 1-(1-isocyanato-1-methylethyl)-3-(1-methylethenyl) benzene and 1-(1-isocyanato-1-methylethyl-4-(1-methylethenyl)benzene.

The reaction of the unsaturated isocyanate with the styrene allyl alcohol copolymer is conveniently carried out in a melt of the copolymer or in an anhydrous solution in a solvent such as an ester, a ketone, or an aromatic hydrocarbon to provide a resin concentration in the range of about 30 to 90 weight percent preferably about 50 to 80 weight percent, and in the presence of a suitable catalyst such as a tertiary amine for example triethylenediamine or a tin compound for example stannous octoate, dibutyltin diacetate, dibutyltin dioctoate or dibutyltin dilaurate. Advantageously, the reaction is carried out at a temperature in the range of about 20 to 170° C. The temperature selected will depend on the reactivity of the isocyanate reactant. For example when 2-isocyanatoethyl methacrylate is the isocyanate used for reaction with the styrene allyl alcohol copolymer, the temperature is preferably in the range of 20 to 50° C. while for 1(1-isocyanato-methylethyl)-3-(1-methylethenyl) benzene, the temperature is preferably in the range of 100° to 150° C.

While stoichiometric quantities of isocyanate and styrene allyl alcohol copolymer can be used in the reaction, it is generally advantageous to use no more than about 98 percent of the stoichiometric quantity of isocyanate to ensure that essentially no-unreacted isocyanate remains in the ethylenically unsaturated carbamate product. Advantageously sufficient isocyanate is used to react with from 20 to 96 percent of the alcohol groups and preferably sufficient to react with 50 to 95 percent of the alcohol groups to provide styrene allyl carbamate copolymers containing from about 1 to about 10 ethylenically unsaturated groups per molecule and preferably from about 2 to about 8 ethylenically unsaturated groups per molecule. With the addition of the isocyanate, the molecular weight of the styrene allyl alcohol is increased from a range of 400 to 4000 to a range of 500 to 6000. Properties of the ethylenically unsaturated carbamates can be modified by reacting a portion of the hydroxyl groups of the copolymer with other reagents to increase such properties as hardness, flexibility and solvent resistance.

The $\alpha,\beta$-ethylenically unsaturated co-reactants are essentially non-volatile ethylenically unsaturated esters and amides in which the double bond is $\alpha,\beta$ to an activating carbonyl. The term "essentially non-volatile" connotes a substance of vapor pressure less than about 130 Pa at 20° C. Monomers which can be included in the coating composition, are advantageously of number average molecular weight less than about 4000 daltons, and unsaturation equivalent weight of less than about 1000 daltons and contain at least about 2 ethylenically unsaturated groups per molecule. Such monomers include maleic and fumaric polyesters formed by reaction of maleic anhydride or acid or fumaric acid with polyol and include (meth)-acrylic esters and amides. Typical (meth)-acrylic esters and amides are represented by the formula

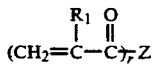

where R is selected from the group consisting of H and CH$_3$, r is an integer in the range of 1 to 10, preferably in the range of 2 to 10, and Z is a saturated or ethylenically unsaturated residue of an alcohol or polyol, an amine or a polyamine, an epoxide or polyepoxide, an isocyanate or polyisocyanate, a methylol amino resin or polymethylol amino resin, where Z is of a number average molecular weight less than about 4000 daltons containing a hydrocarbon, ester, amide, ether, urethane or amino resin backbone. Such monomers may be obtained by reaction of acryloyl or methacryloyl chloride with an alcohol, a polyol, an amine, or a polyamine or by the reaction of acrylic acid, methacrylic acid, acrylamide or methacrylamide with an epoxide, a polyepoxide, an isocyanate, or a polyisocyanate, or by reaction of a hydroxyalkyl acrylate or methacrylate with a carboxylic acid, polycarboxylic acid, an epoxide, a polyepoxide, an isocyanate, a polyisocyanate, a methylol amino resin, a polymethylol amino resin, a methoxymethyl amino resin or a polymethoxymethyl amino resin. Such (meth)-acryloyl compositions include isobornyl acrylate, 1,3-butylene glycol diacrylate, 1,6-hexanediol diacrylate, the polyacrylates and polymethacrylates of polyethyleneoxy diols and polyols, polypropyleneoxy diols and polyols and poly(tetramethyleneoxy) diols and polyols of molecular weight in the range of 100 to 4000 daltons, pentaerythritol tetraacrylate, trimethylolpropane triacrylate, dipentaerythritol monohydroxypentaacrylate, ethoxylated bisphenol A dimethacrylate, the diacrylates and dimethacrylates of epoxy compounds formed from bisphenol A and epichlorohydrin of molecular weight in the range of 200 to 4000 daltons, the polyacryloyl monomers prepared by reacting isocyanate capped polyethers and isocyanate capped polyesters of molecular weight up to 4000 daltons with hydroxyethyl (meth)-acrylate, and the polyacryloyl monomers prepared by reacting (meth)-acrylic acid, (meth)-acrylamide or hydroxyethyl (meth)-acrylate with polymethoxyalkyl amino resins such as hexamethoxymethyl melamine.

The curable compositions of the present invention also comprise a $\beta,\gamma$-ethylenically unsaturated co-reactant in which at least one hydrogen atom is alpha and at least one ethylene double bond is $\beta,\gamma$ to an activating group such as an ether oxygen, a thioether sulfur or an amino nitrogen. Such $\beta,\gamma$-ethylenically unsaturated groups are referred to herein as allylic groups. Such co-reactants advantageously have an unsaturation equivalency of less than about 300 daltons, a number average molecular weight of less than about 10,000 daltons and from 1 to 60 allylic groups per molecule. Preferably the molecular weight is in the range of about 200 to about 4000 daltons and the number of allylic groups per molecule is at least 2 and is preferably four or more. Representative of the allylic group is the allyloxy group (CH$_2$=CH—CH$_2$—O).

Exemplary of compounds useful in the curable compositions of the present invention are triallyl isocyanurate, hexallyl melamine, hexa(allyloxymethyl) melamine; diethylene glycol bis(allyl carbonate); allyl ethers prepared by the ionic polymerization of allyl glycidyl ether; allyloxy compounds prepared from the ionic polymerization of monomers containing allylic groups and $\alpha,\beta$-ethylenically unsaturated groups such as allyl (meth)-acrylates, allyloxyethyl (meth)-acrylates, allyloxyethyl (meth)-acrylamides, and allyl vinyl ethers; cyclopentenyl cyclohexenyl and dicyclopentenyl compounds containing one or more ethylenically unsaturated groups per molecule $\beta,\gamma$ to an activating group; poly(2-buten-1,4-diol) and 2,5-poly(2,5-dihydropyran).

Preferred compounds may be selected from the group of polyethers and polyesters represented by the structural formulae:

where R$_2$ is a radical of molecular weight less than about 15,000 daltons obtained by removal of active hydrogen from an active hydrogen compound selected from the group consisting of water, alcohols, thiols, carboxylic acids, carboxylic amides and amines, where the functionality of R$_2$ is n and is in the range of 1 to 10, where E is a divalent radical selected from the group represented by the formulae

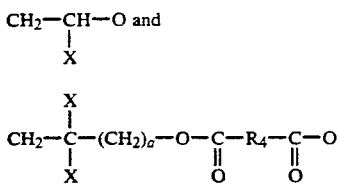

where the X groups are independently selected from the group consisting of H, $CH_3$, $C_2H_5$ and $CH_2OCH_2Y$, Y being selected from the group consisting of $CH=CH_2$, $CH_3-C=CH_2$, and $C_2H_5-C=CH_2$, where a is 0 or 1, where $R_3$ is hydrogen or an unsubstituted or substituted $C_1$ to $C_{10}$ hydrocarbyl radical, where $R_4$ is a divalent unsubstituted or substituted $C_2$ to $C_{10}$ hydrocarbyl radical and where the product of m and n is at least 2 and not more than about 60. Polyethers containing an allyloxy group may be prepared by ionic polymerization of allyl glycidyl ether and an alkylene oxide and polyesters containing an allyloxy group may be prepared by polymerization of a suitable dicarboxylic acid and the monoallyl ether of glycerol. Suitable polyesters may also be prepared by substituting for the monoallyl ether of glycerol, the corresponding mono-ethers of trimethylolethane, trimethylolpropane, pentaerythritol, the diallyl ether of pentaerythritol and similar mono and polyethers of other polyols.

Another group of preferred allyloxy compounds is represented by the structural formula:

where $R_5$ is a $C_2$ $C_{12}$ aliphatic hydrocarbyl or oxahydrocarbyl radical of equivalence p in the range of 2 to 12 and Y is a group as defined hereinabove. Such compounds include tetrallyl pentaerythritol, hexaallyl dipentaerythritol, hexallyl sorbitol, hexamethallyl mannitol, tetraallyl-$\beta$-methyl glucoside, and decaallyl sucrose.

Yet another group of preferred allyloxy compounds are acetals derived from allyl alcohol or methallyl alcohol and aldehydes and those derived from a polyol and an acrolein compound represented by the structural formulas:

$R_6(CH(OCH_2Y)_2)_q$ and $R_7(O_2CHY)_b$ where $R_6$ is absent or is a $C_1$ to $C_{20}$ unsubstituted or substituted hydrocarbyl group, Y is a group as defined hereinabove and q is in the range of 2 to about 30; and where $R_7$ is a radical of molecular weight less than about 10,000 daltons obtained by the formal removal of 2b hydroxy groups from a polyol and b is in the range of about 2 to about 60. Such compounds include 1,1,2,2-tetrakis(allyloxy)ethane, 1,1,6,6-tetrakis(allyloxy)hexane and those derived from acrolein, methacrolein or crotonaldehyde and a polyol and those derived from polyacrolein and acrolein copolymers. Exemplary are triallylidine sorbitol and the polyacrolein acetal of polyvinyl alcohol.

The more preferred allylic compounds are the polyether and polyacetal compounds in which the number of allyloxy groups per average molecule is in the range of 2 to 40 and the allyloxy equivalent is less than about 250 daltons. Most preferably the allyloxy equivalent is less than about 150 daltons.

The compositions of the present invention are used to provide protective or decorative coatings to substrates and are capable of cure under air-drying conditions, i.e. they are capable of cure by hydroperoxides formed upon absorption of oxygen from the air in similar fashion to the conventional method of curing air-drying alkyds. When the coating composition of the present invention is applied to a substrate, reaction of the components of the coating composition is effected under air-dry conditions or by application of heat to provide a cured composition. Generally such reaction requires a free-radical initiator for thermal cure and a free-radical initiator and a metal drier for air-dry cure. Examples of free-radical polymerization initiators include tert-butyl hydroperoxide, methyl ethyl ketone peroxide, cumene peroxide, benzoyl peroxide, lauroyl peroxide, 2,5-dihydroperoxy-2,5-dimethylhexane, azo-bis(isobutyronitrile) and the like and mixtures thereof. Also suitable are oxidized versions of the allylic co-reactant which may be prepared by exposing the allylic co-reactant to air or oxygen until the desired initiating activity is obtained. Suitable metal driers to catalyze the free-radical curing process under air-drying conditions are any of those conventionally used for air-drying of coatings, including the salts and soluble complexes of transition elements such as cobalt and manganese. Typical representatives include cobaltous acetate, citrate, acetylacetonate and 2-ethylhexanoate, and the corresponding soluble manganous salts and complexes. Generally salts generate higher reaction rates. The metallic drier is usually added in the form of a solution in a suitable solvent that will ensure dispersion of drier throughout the coating composition and can be added in formulation of the coating composition with the $\alpha,\beta$-ethylenically unsaturated co-reactant or separately during or after application of the composition to the substrate. The concentration range of metallic drier is generally in the range of 0.001 to 1.0% by weight of the coating composition.

The proportions of the ingredients can vary widely depending on the compatibility of the major ingredients, namely the unsaturated carbamate of styrene allyl alcohol copolymer, the $\alpha,\beta$-ethylenically unsaturated compound, the allylic unsaturated compound and the nature of the coating to be obtained. The major ingredients are advantageously selected to be compatible with one another, to provide an effective amount of the allylic unsaturated compound, i.e., an amount sufficient to provide an increase in the rate of cure of the coating over that under the same conditions without its presence, to provide an adequate degree of hardness in the uncured coating to allow sanding and buffing without blinding the sand paper, and to avoid impairment of gloss and clarity of the cured coatings. Compatibility is readily determined by mixing the major ingredients and determining the range of mixtures which do not form cloudy solutions or coatings or separate into phases. Provided that the major ingredients are suitably compatible and provided that the dry uncured coating composition is sufficiently hard for its intended purpose, the weight range of the unsaturated carbamate of the styrene allyl alcohol copolymer can be from about 30 to about 95 percent, the weight range of the $\alpha,\beta$-ethylenically unsaturated co-reactant can be from about 60 to about 4 percent and the weight range of the $\beta,\gamma$-ethylenically unsaturated co-reactant can be from about 30 to about 4 percent, all percentages being based on the total weight of the unsaturated carbamate of the styrene allyl alcohol copolymer, the $\alpha,\beta$-ethylenically unsaturated co-reactant and the $\beta,\gamma$-ethylenically unsaturated co-reactant. The preferred ranges are about 45 to about 80 percent, about 45 to about 10 percent and about 25 to about 10 percent respectively.

The concentration of free-radical initiator in the total weight of unsaturated reactants and initiator can vary from about 1 to about 100 meq. per 100 g. and preferably from about 5 to about 30 meq. per 100 g. to provide an adequate rate of cure without excessive generation of by-products.

Curing of the coating composition after it has been deposited on the substrate can be carried out at temperatures of 250° C. or lower. Though the cure rate will usually increase as the temperature increases the preferred cure temperature for low energy curing is 10° C. to 60° C. and the initiator and metal drier and their concentrations are selected to be effective in this temperature range.

The coating compositions of the present invention comprising the ethylenically unsaturated carbamate of a styrene allyl alcohol copolymer, the $\alpha,\beta$-ethylenically unsaturated co-reactant, the $\beta,\gamma$-ethylenically unsaturated co-reactant and the initiator and when required, the metal drier are generally prepared by mixing the ingredients in the desired proportions with a solvent. The solvent used is generally the solvent in which the ethylenically unsaturated carbamate is prepared, e.g., a ketone, an ester or an aromatic hydrocarbon. Advantageously, the coating compositions can be applied at high solids, thus reducing the amount of volatile organic compounds released upon drying. The composition is applied to a suitable substrate such as wood, plastic, metal, ceramic and the like by spraying, dipping, brushing, curtain coating and the like. After coating the solvent is allowed to evaporate, aided by heat or forced air if necessary, until the coating is tack free. At this stage the coating can be repaired for example by removal with solvent and recoating, or by sanding, buffing and polishing. This intermediate stage is then cured to achieve solvent and abrasion resistance by allowing the coating to air dry over an extended period of time, or by heating or forced drying. Curing can be accelerated by carrying it out in an oxygen deficient atmosphere.

The order of mixing of the components of the coating composition is not critical so long as the initiator and optionally, metal drier are supplied in effective concentrations. Because of the limited pot-life of the mixture when the initiator is added, it can be convenient to supply the components in appropriate streams continuously in the desired weight ratio to a mixer-applicator or spray gun and thereafter to apply or spray the mixed coating composition onto the substrate.

When a metal drier catalyst is included in the coating composition, latency can be conferred on the catalyst by introducing a volatile or fugitive acid such as trifluoracetic acid, glycolic acid or 1,1,1-trifluoro-2,4-pentanedione in a ratio of 1 to 10 moles per mole of metal drier. By this method pot-life can be enhanced from hours to days. The compositions of the invention can also include (besides the monomers, oligomers, and resins mentioned above), a variety of additives utilized for their known purposes, such as stabilizers, inhibitors, lubricants, flexibilizers, pigments, dyes, and fillers such as finely divided silica, diatomaceous earth, metal oxides, fiberglass, glass bubbles, and talc. Fillers can generally be used in proportions up to about 200 percent by weight of the curable composition but preferably are used up to about 50 percent by weight.

The following examples are set forth to illustrate the invention and should not be construed as limiting its scope. Quantities and percentages are by weight unless otherwise indicated.

PREPARATION OF ETHYLENICALLY UNSATURATED CARBAMATES OF STYRENE ALLYL ALCOHOL COPOLYMERS

EXAMPLE 1

1000 parts by weight of a styrene allyl alcohol copolymer of number average molecular weight 1150 and hydroxy equivalent weight of 220 (sold by Monsanto Company under the registered trademark RJ101) is dissolved in 1802 parts by weight of refluxing methyl isobutyl ketone while 690 parts by weight of the ketone is distilled. The solution is cooled to 70° C. and a nitrogen blanket is maintained over it. Dibutyltin diacetate (4.91 parts by weight) in 40 parts by weight of toluene is added and stirred in. 877 parts by weight of 1(1-isocyanato-1-methylethyl)-3-(3-(1-methylethenyl)benzene, hereinafter referred to as IMB, (0.96 equivalent to 1 equivalent of SAA copolymer) is added at a steady rate over a period of 2 hours to the stirred solution of styrene allyl alcohol copolymer. Heating is continued at 70° C. after the addition is complete until the solution is shown by infrared analysis to be isocyanate free. The solution contains 62 percent solids and is of viscosity 420 cps. The unsaturation equivalent weight of the unsaturated carbamate is 433.

EXAMPLE 2

Example 1 is repeated with an equivalent ratio of 0.5 IMB to 1.0 SAA copolymer. A 56.5 percent solids solution in methyl isobutyl ketone of 140 cps viscosity is obtained. The unsaturation equivalent weight of the unsaturated carbamate is 663.

EXAMPLE 3

Example 1 is repeated at the same equivalent ratio of 0.95 IMB to 1.0 SAA copolymer using a styrene allyl alcohol copolymer of number average molecular weight 1600 and hydroxy equivalent of 302. A 56.6 percent solids solution of 150 cps viscosity is obtained. The unsaturation equivalent weight of the unsaturated carbamate is 517.

EXAMPLE 4

Example 1 is repeated with an equivalent ratio of 0.73 IMB to 1.0 SAA copolymer. A 59.2 percent solids solution in methyl iso-butyl ketone of 224 cps viscosity is obtained. The unsaturation equivalent weight of the unsaturated carbamate is 517.

EXAMPLE 5

Example 1 is repeated with an equivalent ratio of 0.25 IMB to 1.0 SAA copolymer. A 60.2 percent solids solution of 320 cps viscosity is obtained. The unsaturation equivalent weight of the unsaturated carbamate is 1125.

EXAMPLE 6

Example 3 is repeated with an equivalent ratio of 0.50 IMB to 1.0 SAA copolymer. A 60% solids solution of 300 cps viscosity is obtained. The unsaturation equivalent weight of the unsaturated carbamate is 832.

EXAMPLE 7

Example 3 is repeated with an equivalent ratio of 0.25 IMB to 1.0 SAA copolymer. A 57 percent solids solution of 260 cps viscosity is obtained. The unsaturation equivalent weight of the unsaturation carbamate is 1462.

EXAMPLE 8

48 parts by weight of the styrene copolymer of Example 1 is reacted at room temperature with 32.9 parts by weight of 2-isocyanatoethyl methacrylate (IEM) using dibutyltin diacetate (0.5 parts) as catalyst to provide a 31 weight percent solution of unsaturated carbamate in methyl isobutyl ketone. The viscosity of the solution is 100 cps. The unsaturation equivalent weight of the unsaturated carbamate is 372.

EVALUATION OF COATING COMPOSITIONS

EXAMPLE 9

A coating composition is prepared by mixing 80 parts of the unsaturated carbamate of styrene allyl alcohol of Example 1 with 20 parts of a poly(allyl glycidyl ether) sold by Monsanto Company under the registered trademark Santolink X1-100, of molecular weight 1200 and unsaturation equivalent 116, prepared by cationic polymerization of allyl glycidyl ether using ethylene glycol as the initiator species, 0.5 parts of 2,5-dihydroperoxy-2,5-dimethylhexane, and 0.04 part cobalt supplied as potassium cobalt naphthenate sold by Nuodex, Inc. under the registered trademark Nuocure CK. The pot-life is greater than 20 days. The coating composition is applied to glass plates to give a dry film of 1.5 mils. The film is sandable after ten minutes when it reaches the tack free state. Under ambient cure conditions, it achieves a Tukon hardness of 9 after 1 day and 19 after 7 days. Its solvent resistance increases from 30 MEK double rubs after 1 day to 80 MEK double rubs after 7 days. When the dry film is cured for 30 minutes at 65° C., the Tukon hardness is 9 and the solvent resistance is 10 MEK double rubs.

EXAMPLE 10

Example 9 is repeated with the following coating composition.
55 parts of the unsaturated carbamate of Example 1 (60% in methyl isobutyl ketone).
20 parts of the poly(allyl glycidyl ether) of Example 9.
25 parts of an acrylated epoxy resin sold by Celanese under the tradename RDX-80945.
0.5 part 2,5-dihydroperoxy-2,5-dimethylhexane (DHDMH).
0.04 part Co supplied as Nuocure CK.

The pot-life of the composition is less than 5 days. The tack free time is 10 minutes. Under ambient cure conditions, the Tukon hardness increases from 7 after one day to 16 after 7 days and the solvent resistance increases from 25 MEK double rubs to 300+. When the coating is cured for 30 minutes at 65° C., the Tukon hardness is 15 increasing to 20 after 7 days under ambient conditions and the solvent resistance is 300+ MEK double rubs.

EXAMPLES 11 AND 12 AND COMPARATIVE EXAMPLES C1-C5

The following coating compositions are prepared.

| | Ex C-1 | Ex 11 | Ex C-2 | Ex 12 | Ex C-3 | Ex C-4 | Ex C-5 |
|---|---|---|---|---|---|---|---|
| Unsaturated Carbamate of Ex. 1 | 5.0 | 3.0 | 4.0 | 3.67 | 3.0 | 4.0 | 3.0 |
| Santolink X1-100 | 0 | 1.0 | 0 | 0.67 | 0 | 1.0 | 2.0 |
| RDX-80945 | 0 | 1.0 | 1.0 | 0.67 | 2.0 | 0 | 0 |
| DHDMH | 0 | .025 | 0 | .0165 | 0 | .025 | .05 |
| Nuocure CK (Parts Co.) | 0.001 | 0.001 | 0.001 | 0.001 | 0.001 | 0.001 | 0.001 |

RDX-80945 — acrylated epoxy resin sold by Celanese Corporation as a 25% solution in methyl isobutyl ketone.
DHDMH — 2,5-dihydroperoxy-2,5-dimethylhexane
Nuocure CK — potassium cobalt naphthenate, sold by Nuodex, Inc.

The coating compositions are applied to Bonderite panels using a 5 mil drawdown blade. The films are air dried for 24 hours. Hardness, gloss and solvent resistance are measured. The panels are then baked at 70° C. for 30 minutes and re-evaluated. The data are presented in Table 1.

TABLE 1

| | Example | | | | | | |
|---|---|---|---|---|---|---|---|
| | C-1 | 11 | C-2 | 12 | C-3 | C-4 | C-5 |
| Tack-free time (min) | 45 | 50 | 48 | 38 | 112 | 31 | 120 |
| Before curing | | | | | | | |
| 20° Gloss | 99% | 99% | 95% | 99% | 94% | 100% | 93% |
| Tukon hardness | 1 | 5 | 1 | 3 | 1 | 5 | 5 |
| MEK rubs | <10 | <10 | <10 | <10 | <10 | <10 | <10 |
| After curing | | | | | | | |
| 20° Gloss | 94% | 98% | 96% | 101% | 96% | 100% | 96% |
| Tukon Hardness | 14 | 21 | 20 | 17 | 7 | 15 | 13 |
| MEK Rubs | 10 | 300 | 10 | 100 | 10 | 10 | 25 |

EXAMPLES 13-17

Coating compositions are prepared from 5 parts of the unsaturated carbamate of Example 1 (25% solids in methyl isobutyl ketone), 0.25 parts of Santolink X1-100, 0.25 parts of an α,β-ethylenically unsaturated co-reactant, 0.0013 parts of DHDMH and 0.001 parts of Co supplied as Nuocure CK. The compositions are coated on Bonderite panels with a 5 mil drawdown blade and air-dried. The coatings are sandable when they become tack-free. After 24 hours air drying and heating at 70° C. for 30 minutes, the coatings are evaluated for gloss, hardness and solvent resistance. The data are presented in Table 2.

TABLE 2

| | Example | | | | |
|---|---|---|---|---|---|
| | 13 | 14 | 15 | 16 | 17 |
| Co-Reactant | TMPTA | TPGDA | NGPDA | TMPPTA | RDX80945 |
| 20° Gloss | 97% | 97% | 96% | 97% | 100% |
| Tukon Hardness | 13 | 13 | 12 | 12 | 13 |
| MEK rubs | 300 | 300 | 300 | 300 | 300 |

TMPTA — trimethylolpropane triacrylate
TPGDA — tripropyleneglycol diacrylate
NGPDA — neopentyl glycol propoxylate diacrylate
TMPPTA — trimethylolpropane propoxylate triacrylate

What is claimed is:

1. A coating composition capable of air-drying cure comprising (a) an ethylenically unsaturated carbamate derived from a styrene allyl alcohol copolymer and an ethylenically unsaturated isocyanate selected from the group consisting of isocyanatoalkyl acrylates, isocyanatoalkyl methacrylates, and aralkyl isocyanates, (b) an $\alpha,\beta$-ethylenically unsaturated co-reactant and (c) a $\beta,\gamma$-ethylenically unsaturated co-reactant.

2. The coating composition of claim 1 wherein the styrene allyl alcohol copolymer is a copolymer of styrene or a substituted styrene and allyl alcohol or methallyl alcohol, has a hydroxy content of from about 1.8 to about 10 percent by weight and a styrene or substituted styrene content of from about 50 to about 94 percent by weight, and is of number average molecular weight in the range of about 400 to about 5000 daltons.

3. The coating composition of claim 2 wherein the styrene allyl alcohol copolymer has an ethylenically unsaturated carbamate hydroxy content in the range of about 4 to about 9 weight percent and a number average molecular weight in the range of about 800 to about 2000 daltons.

4. The coating composition of claim 1 wherein the isocyanate is selected from the group consisting of 2-isocyanatoethyl acrylate, 2-isocyanatoethyl methacrylate, 3-isocyanatopropyl methacrylate, 1-methyl-2-isocyanatoethyl methacrylate, 1,1-dimethyl-2-isocyanatoethyl methacrylate, 1-(1-isocyanatoethyl)-3-vinyl-benzene, 1-(1-isocyanatoethyl)-4-vinylbenzene, 1-(1-isocyanato-1-methylethyl)-3-(1-methylethenyl) benzene and 1-(1-isocyanato-1-methylethyl)-4-(1-methylethenyl) benzene.

5. The coating composition of claim 1 wherein the isocyanate is isocyanatoethyl acrylate or isocyanatoethyl methacrylate.

6. The coating composition of claim 1 wherein the isocyanate is 1-(1-isocyanato-1-methylethyl)-3-(1-methylethenyl)benzene.

7. The coating composition of claim 2 wherein the ethylenically unsaturated carbamate has a number average molecular weight in the range of about 500 to about 6000 daltons, and contains from about 1 to about 10 ethylenically unsaturated groups per molecule.

8. The coating composition of claim 7 wherein the ethylenically unsaturated carbamate contains from about 2 to about 8 ethylenically unsaturated groups per molecule.

9. The coating composition of claim 1 wherein the $\alpha,\beta$-ethylenically unsaturated co-reactant has an unsaturation equivalent weight of less than 1000 daltons and is a maleic or fumaric ester or a (meth)-acrylic ester or amide containing at least about 2 $\alpha,\beta$-ethylenically unsaturated groups per molecule.

10. The coating composition of claim 9 wherein the (meth)-acrylic ester or amide is represented by the formula

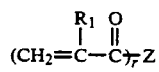

where $R_1$ is selected from the group consisting of H and $CH_3$ where r is an integer in the range of 2 to 10, and Z is a saturated or ethylenically unsaturated residue of an alcohol or polyol, an amine or a polyamine, an epoxide or polyepoxide, an isocyanate or polyisocyanate, a methylol amino resin or polymethylol amino resin, where Z is of a number average molecular weight less than about 4000 daltons containing a hydrocarbon, ester, amide, ether, urethane or amino resin backbone.

11. The coating composition of claim 1 wherein the $\beta,\gamma$-ethylenically unsaturated co-reactant has an unsaturation equivalency of less than about 300 daltons, a number average molecular weight of less than about 10,000 daltons, and from 1 to 60 allylic groups per molecule.

12. The coating composition of claim 1 wherein the $\beta,\gamma$-ethylenically unsaturated co-reactant is a compound selected from the group represented by the formulae:

$$R_2((E)_m R_3)_n, R_5(OCH_2Y)_p, R_6(CH(OCH_2Y)_2)_q \text{ or } R_7(O_2CHY)_b$$

where $R_2$ is a radical of molecular weight less than about 15,000 daltons obtained by removal of active hydrogen from an active hydrogen compound selected from the group consisting of water, alcohols, thiols, carboxylic acids, carboxylic amides and amines, where the functionality of $R_2$ is n and is in the range of 1 to 10, where E is a divalent radical selected from the group represented by the formulae

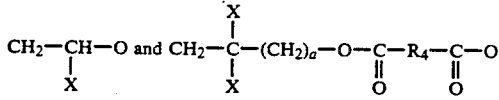

where X is selected from the group consisting of H, $CH_3$, $C_2H_5$ and $CH_2OCH_2Y$, Y being selected from the group consisting of

where a is 0 or 1, where $R_3$ is hydrogen or an unsubstituted or substituted $C_1$ to $C_{10}$ hydrocarbyl radical, where $R_4$ is a divalent unsubstituted or substituted $C_2$ to $C_{10}$ hydrocarbyl radical and where the product of m and n is at least 2 and not more than about 60; where $R_5$ is a $C_2$ to $C_{12}$ aliphatic hydrocarbyl or oxahydrocarbyl radical of equivalence p in the range of 2 to 12; where $R_6$ is absent or is a $C_1$ to $C_{20}$ unsubstituted or substituted hydrocarbyl group and q is in the range of 2 to about 30; where $R_7$ is a radical of molecular weight less than about 10,000 daltons obtained by removal of 2b active hydrogens from a polyol and b is in the range of about 2 to about 60; and wherein the allyloxy compound contains from 2 to 60 allyloxy groups per molecule.

13. The coating composition of claim 1 wherein the styrene allyl alcohol copolymer is a copolymer of styrene or a substituted styrene and allyl alcohol or methallyl alcohol, has a hydroxy content of from about 1.8 to about 10 percent by weight and a styrene or substituted styrene content of from about 50 to about 94 percent by weight, and is of number average molecular weight in the range of about 400 to about 5000 daltons; wherein the isocyanate is selected from the group consisting of 2-isocyanatoethyl acrylate, 2-isocyanatoethyl methacrylate, 3-isocyanatopropyl methacrylate, 1-methyl-2-isocyanatoethyl methacrylate, 1,1-dimethyl-2-isocyanatoethyl methacrylate, 1-(1-isocyanatoethyl)-3-vinyl-benzene, 1-(1-isocyanatoethyl)-4-vinylbenzene, 1-(1-isocyanato-1-methylethyl)-3-(1-methylethenyl)-benzene and 1-(1-isocyanato-1-methylethyl)-4-(1-methylethenyl)benzene; wherein the $\alpha,\beta$-ethylenically unsaturated co-reactant has an unsaturation equivalent weight of less than 1000 daltons and is a maleic or fumaric ester or a (meth)-acrylic ester or amide containing at least about 2 $\alpha,\beta$-ethylenically unsaturated groups per molecule: and wherein the $\beta,\gamma$-ethylenically unsaturated co-reactant is a compound selected from the group represented by the formulae:

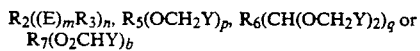
$R_2((E)_mR_3)_n$, $R_5(OCH_2Y)_p$, $R_6(CH(OCH_2Y)_2)_q$ or $R_7(O_2CHY)_b$ where $R_2$ is a radical of molecular weight less than about 15,000 daltons obtained by removal of active hydrogen from an active hydrogen compound selected from the group consisting of water, alcohols, thiols, carboxylic acids, carboxylic amides and amines, where the functionality of $R_2$ is n and is in the range of 1 to 10, where E is a divalent radical selected from the group represented by the formulae

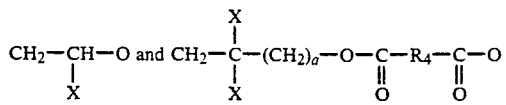

where X is selected from the group consisting of H, $CH_3$, $C_2H_5$ and $CH_2OCH_2Y$, Y being selected from the group consisting of

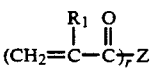
$CH{=}CH_2$, $CH_3{-}C{=}CH_2$, and $C_2H_5{-}C{=}CH_2$ where a is 0 or 1, where $R_3$ is hydrogen or an unsubstituted or substituted $C_1$ to $C_{10}$ hydrocarbyl radical, where $R_4$ is a divalent unsubstituted or substituted $C_2$ to $C_{10}$ hydrocarbyl radical and where the product of m and n is at least 2 and not more than about 60; where $R_5$ is a $C_2$ to $C_{12}$ aliphatic hydrocarbyl or oxahydrocarbyl radical of equivalence p in the range of 2 to 12; where $R_6$ is absent or is a $C_1$ to $C_{20}$ unsubstituted or substituted hydrocarbyl group and q is in the range of 2 to about 30; where $R_7$ is a radical of molecular weight less than about 10,000 daltons obtained by removal of 2b active hydrogens from a polyol and b is in the range of about 2 to about 60; wherein the allyloxy compound contains from 2 to 60 allyloxy groups per molecule; and wherein the weight range of the ethylenically unsaturated carbamate is from 30 to 92 percent, the weight range of $\alpha,\beta$-ethylenically unsaturated co-reactant is in the range of 60 to 4 percent and the weight range of $\beta,\gamma$-ethylenically unsaturated co-reactant is in the range of 30 to 4 percent, all percentages being based on the total weight of ethylenically unsaturated carbamate, $\alpha,\beta$-ethylenically unsaturated co-reactant and $\beta,\gamma$-ethylenically unsaturated co-reactant.

14. The coating composition of claim 13 wherein the (meth)-acrylic ester or amide is represented by the formula $$(CH_2{=}\overset{R_1}{\underset{|}{C}}{-}\overset{O}{\overset{\|}{C}})_r Z$$

where $R_1$ is selected from the group consisting of H and $CH_3$ where r is an integer in the range of 2 to 10, and Z is a saturated or ethylenically unsaturated residue of an alcohol or polyol, an amine or a polyamine, an epoxide or polyepoxide, an isocyanate or polyisocyanate, a methylol amino resin or polymethylol amino resin, where Z is of a number average molecular weight less than about 4000 daltons containing a hydrocarbon, ester, amide, ether, urethane or amino resin backbone.

* * * * *

UNITED STATES PATENT AND TRADEMARK OFFICE
CERTIFICATE OF CORRECTION

PATENT NO. : 5,075,384
DATED : December 24, 1991
INVENTOR(S) : William A. DuPont and Jerome W. Knapczyk It is certified that error appears in the above-identified patent and that said Letters Patent is hereby corrected as shown below:

Column 2, line 11, Delete "500" and insert --5000--.

Column 3, line 52, Delete "R" and insert --$R_1$--.

Column 4, line 59, Delete "$R_2((E)_m R_3)_n$" and insert --$R_2((E\}_m R_3)_n$--.

Column 5, line 34, Delete "$C_2 C_{12}$" and insert --$C_2$ to $C_{12}$--.

Column 8, line 22, Delete "-3-(3-(1-" and insert ---3-(1---.

Column 13, line 36, Delete "molecule:" and insert --molecule;--.

Signed and Sealed this

Eighth Day of June, 1993

Attest:

MICHAEL K. KIRK

Attesting Officer   Acting Commissioner of Patents and Trademarks